(12) United States Patent
Lammel et al.

(10) Patent No.: US 7,861,229 B2
(45) Date of Patent: Dec. 28, 2010

(54) COMPLEXITY METRICS FOR DATA SCHEMAS

(75) Inventors: Ralf Lammel, Redmond, WA (US); Stanislav Kitsis, Snoqualmie, WA (US); David L. Remy, Mercer Island, WA (US); Priyamvadha P. Lakshminarayanan, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1322 days.

(21) Appl. No.: 11/376,946

(22) Filed: Mar. 16, 2006

(65) Prior Publication Data

US 2007/0220486 A1 Sep. 20, 2007

(51) Int. Cl.
G06F 9/44 (2006.01)

(52) U.S. Cl. .................... 717/126; 717/124; 717/141; 714/47; 707/101; 707/634; 707/637

(58) Field of Classification Search ............... 717/114, 717/124, 141; 714/47; 707/634, 637
See application file for complete search history.

(56) References Cited

U.S. PATENT DOCUMENTS

| | | | |
|---|---|---|---|
| 6,044,152 A | 3/2000 | Mendolia | |
| 6,104,916 A | 8/2000 | Steinhoff et al. | |
| 6,128,773 A * | 10/2000 | Snider | 717/132 |
| 6,230,269 B1 | 5/2001 | Spies et al. | |
| 6,651,244 B1 * | 11/2003 | Smith et al. | 717/154 |
| 6,662,300 B1 | 12/2003 | Peters | |
| 6,754,507 B2 | 6/2004 | Takagi | |
| 6,845,380 B2 | 1/2005 | Su et al. | |
| 6,848,078 B1 | 1/2005 | Birsan et al. | |
| 6,912,538 B2 * | 6/2005 | Stapel et al. | 1/1 |
| 6,925,313 B2 | 8/2005 | Kweon et al. | |
| 7,152,244 B2 | 12/2006 | Toomey | |
| 2002/0087571 A1 * | 7/2002 | Stapel et al. | 707/100 |
| 2003/0023876 A1 | 1/2003 | Bardsley et al. | |

(Continued)

FOREIGN PATENT DOCUMENTS

JP 14-073553 A 3/2002

OTHER PUBLICATIONS

Title: Determining the complexity of XML documents Author: Qureshi, Mustafa, and Samadzadeh M.H. Conference Title: ITCC 2005—International Conference on Information Technology:Coding and Computing. Conference Location : Las Vegas NV, USA.*

(Continued)

Primary Examiner—Tuan Q Dam
Assistant Examiner—Ziaul Chowdhury
(74) Attorney, Agent, or Firm—Workman Nydegger

(57) ABSTRACT

A schema code complexity analysis architecture that computes complexity data for output to a code designer. The complexity data can be in the form of a number and/or complexity level. A schema component is provided for processing schema code, and a metrics component, for outputting a complexity value based on complexity of the schema code. In one implementation, the schema code is based on an XML schema, and the metrics component employs a newly-defined variation of a McCabe cyclomatic complexity metric to determine the complexity value. The decisions employed for computing schema complexity can include choices, occurrence constraints, element references to substitution groups, type references to types that are extended or restricted, a multiplicity of root element declarations, and nillable elements.

14 Claims, 16 Drawing Sheets

U.S. PATENT DOCUMENTS

| | | |
|---|---|---|
| 2003/0025668 A1 | 2/2003 | Lin |
| 2003/0163737 A1 | 8/2003 | Roskind |
| 2003/0199289 A1 | 10/2003 | Kao et al. |
| 2003/0204481 A1 | 10/2003 | Lau |
| 2004/0044678 A1* | 3/2004 | Kalia et al. ............... 707/102 |
| 2004/0060007 A1 | 3/2004 | Gottlob et al. |
| 2004/0128296 A1 | 7/2004 | Krishnamurthy et al. |
| 2004/0143581 A1 | 7/2004 | Bohannon et al. |
| 2004/0158714 A1 | 8/2004 | Peyravian |
| 2004/0261018 A1 | 12/2004 | Dunne et al. |
| 2005/0022020 A1 | 1/2005 | Fremberg |
| 2005/0041009 A1 | 2/2005 | Kuroda |
| 2005/0049017 A1 | 3/2005 | Yoda |
| 2005/0068913 A1 | 3/2005 | Tan et al. |
| 2005/0087769 A1 | 4/2005 | Yamazaki et al. |
| 2005/0108567 A1 | 5/2005 | D'Souza et al. |
| 2005/0127820 A1 | 6/2005 | Yamazaki et al. |
| 2005/0177578 A1 | 8/2005 | Chen |
| 2005/0179850 A1 | 8/2005 | Du |
| 2005/0182778 A1 | 8/2005 | Heuer et al. |
| 2005/0192990 A1 | 9/2005 | Kharitidi et al. |
| 2005/0229097 A1 | 10/2005 | Lander |
| 2005/0235358 A1 | 10/2005 | Keohane et al. |
| 2006/0055608 A1 | 3/2006 | Minemura |
| 2006/0200856 A1 | 9/2006 | Salowey et al. |
| 2006/0216469 A1 | 9/2006 | Hashizume |
| 2006/0232495 A1 | 10/2006 | Chang et al. |
| 2006/0250312 A1 | 11/2006 | Kobayashi |
| 2007/0005984 A1 | 1/2007 | Florencio et al. |
| 2007/0006305 A1 | 1/2007 | Florencio et al. |
| 2007/0199054 A1 | 8/2007 | Florencio et al. |
| 2007/0255751 A1* | 11/2007 | Bansal et al. ........... 707/103 R |
| 2008/0015002 A1 | 1/2008 | Crisp |

OTHER PUBLICATIONS

Title: A DTD Complexity Metrics. Author: McFadyen Ron, and Chen Yangjun. Confernce Title: 21st IASTED International Multi-Confernce on Applied Informatics. Conference Location: Innsbruck, Austria.*

Adida, B. et al., "Fighting Phishing Attacks: A Lightweight Trust Architecture for Detecting Spoofed Emails," in Proceedings of DIMACS Workshop on Theft in E-Commerce: Content, Identity, and Service, Piscataway, New Jersey, Apr. 2005, 16 pages.

Adida, B. et al., "Separable Identity-based Ring Signatures: Theoretical Foundations for Fighting Phishing Attacks," in Proceedings of DIMACS Workshop on Theft in E-Commerce: Content, Identity, and Service, Piscataway, New Jersey, Feb. 28, 2005, 18 pages.

Anti-Phishing Working Group, at http://www.antiphishing.org, last accessed Feb. 28, 2006.

Bloom Filter http://www.nist.gov/dads/HTML/bloomFilter.html, last viewed, Mar. 14, 2006, 1 page.

Boneh, et al., "Defending Against Online Identity Theft and Phishing," presentation given at Proceedings: United States—Japan Critical Information Infrastructure Protection Workshop, Sep. 2004, available at: http://www2.gwu.edu/~usjpciip/BonehD.pdf.

Boneh, et al., "Web Password Hashing," 3 pages, last accessed Jun. 28, 2005, available at: http://crypto.stanford.edu/PwdHash/.

Chou, N. et al., "Client-Side Defense Against Web-Based Identity Theft," in Proceedings of 11th Annual Network and Distributed System Security Symposium (NDSS '04), San Diego, Feb. 2004, 16 pages.

Delany, M., "Domain-Based Email Authentication Using Public-Keys Advertised in the DNS (DomainKeys)," Internet Draft available at: http://www.ietf.org/internet-drafts/draft-delany-domainkeys-base-03.txt, Sep. 29, 2005, last checked Feb. 24, 2006, 40 pages.

Earthlink Toolbar Featuring ScamBlocker for Windows Users http://www/earthlink.net/software/free/toolbar/, last accessed Mar. 14, 2006, 2 pages.

Florencio, D. and Herley, C., "Stopping a Phishing Attack, Even When the Victims Ignore Warnings," Microsoft Research Technical Report, Oct. 2005. Available at: http://research.microsoft.com/research/pubs/view.aspx?type=Publication&id=1489, last accessed Feb. 24, 2006.

Gabber, E. et al., "How to Make Personalized Web Browsing Simple, Secure, and Anonymous," Financial Cryptography, 1997, pp. 17-32.

Halderman, J.A. et al., "A Convenient Method for Securely Managing Passwords," in Proceedings of the 14th International World Wide Web Conference (WWW 2005), Chiba, Japan, May 10-14, 2005, 9 pages.

http://www.passport.com, links directly to: https://accountservices.passport.net/ppnetworkhome.srf?vv=330&lc=1033, last accessed Feb. 28, 2006.

http://www.spoofstick.com, last accessed Feb. 28, 2006.

International Search Report dated Oct. 24, 2007 for PCT Application Serial No. PCT/US2007/004044, 3 Pages.

Jakobsson, M. and Young, A., "Distributed Phishing Attacks," in Proceedings of DIMACS Workshop on Theft in E-Commerce: Content, Identity, and Service, Piscataway, New Jersey, Apr. 2005, 10 pages.

Kelsey, J. et al., "Secure Applications of Low-Entropy Keys," Lecture Notes in Computer Science, 1997, vol. 1396, pp. 121-134.

Netcraft, "Netcraft Toolbar Help Pages FAQ," 2004, available at: http://toolbar.netcraft.com/help/faq/index.html.

Oechslin, P., "Making a Faster Cryptanalytical Time-Memory Trade-Off," in Proceedings of Advances in Cryptology—CRYPTO 2003, 23rd Annual International Cryptology Conference, Santa Barbara, California, Aug. 17-21, 2003, 15 pages.

Ross, B. et al., "A Browser Plug-In Solution to the Unique Password Problem," in Proceedings of the 14th USENIX Security Symposium, Technical Report Stanford-SecLab-TR-2005-1, 2005, 15 pages.

Ross, et al. "Stronger Password Authentication Using Browser Extensions" (2005) Proceedings of the 14th Usenix Security Symposium 15 pages.

Sahami, M. et al., "A Bayesian Approach to Filtering Junk Email," in AAAI '98 Workshop on Learning for Text Categorization, Jul. 1998, 8 pages.

Luc Segoufin, Typing and Querying XML Documents: Some Complexity Bounds http://delivery.acm.org/10.1145/780000/773170/p167-segoufin.pdf?key1=773170&key2=7019847311 &coll=GUIDE&dl=GUIDE&CFID=65860176 &CFTOKEN=65663645.

Mustafa H. Qureshi, et al., Determining the Complexity of XML Documents http://doi.ieeecomputersociety.org/10.1109/ITCC.2005. 126.

Thomas J. McCabe, A complexity measure http://portal.acm.org/citation.cfm?id=807712&coll=GUIDE&dl=GUIDe &CFID=62736624&CFTOKEN=661444&ret=1#Fulltext.

James F. Power, et al., A metrics suite for grammar-based software, Journal of Software Maintenance and Evolution: Research and Practice, 2004 http://www.cs.nuim.ie/~jpower/Research/Papers/2004/jsme04.pdf.

OA Dated Dec. 23, 2008 for U.S. Appl. No. 11/318,378, 25 pages.
OA Dated Dec. 3, 2008 for U.S. Appl. No. 11/317,767, 13 pages.
OA Dated Oct. 15, 2008 for U.S. Appl. No. 11/318,209, 14 pages.
OA Dated Dec. 29, 2008 for U.S. Appl. No. 11/319,377, 19 pages.

* cited by examiner

COMPLEXITY METRICS FOR DATA SCHEMAS

BACKGROUND

Most commercial enterprises require, and are, in some way, affected by the software employed in its business processes. Accordingly, software metrics is a huge field in software engineering. Software metrics can provide a quantitative and qualitative basis for the development and validation of software models.

As different models evolve in the industry, each can provide benefits in some areas and shortcomings in other areas. More recently, XML (eXtensible Markup Language) schema models have been favored for use in many areas. Schemas can be used as interface definitions, protocol specifications and data models, just to name a few. Accordingly, schema analysis is a key ingredient of an emerging engineering discipline for schemaware (e.g., XML), schema-based data management, schema-aware programming (e.g., XML), and more generally, software development that includes schema artifacts.

Schema analysis aims to extract this quantitative and qualitative information from the actual schema models. To this end, schemas are measured through systematic algorithms, on the basis of the intrinsic feature model of the XSD (XML schema definition) language. XML schema analysis is a derivative of software analysis (program analysis) and of software code metrics, in particular. However, there is little or no work, whatsoever, being done on XML schema metrics. Moreover, given the widespread adoption of XML schema and the current investments by XML technology providers into XML schema design tools, such metrics can form an important aspect for schema development.

SUMMARY

The following presents a simplified summary in order to provide a basic understanding of some aspects of the disclosed innovation. This summary is not an extensive overview, and it is not intended to identify key/critical elements or to delineate the scope thereof. Its sole purpose is to present some concepts in a simplified form as a prelude to the more detailed description that is presented later.

The disclosed innovation provides an unprecedented feature in tool support for schema design (e.g., XML schema design and DTD-document type definition). That is, novel complexity metrics are provided which include feedback to schema developers such that they get to know about the code complexity of their schema code. In particular, schema designers can thereby be encouraged to decrease complexity on the basis of refactorings and other transformations, and they can measure they effect of their schema changes. The invention is a code-level complexity metric that can be algorithmically calculated for any given schema.

In one aspect of the invention, metrics provides a single ordinal number that summarizes the psychological code complexity of a schema in terms of the decisions that are encoded in the XML schema. Without such a metrics, schema developers are not able to quantify the complexity of their schemas; and therefore, they cannot assess whether or not the complexity of a schema is acceptable, whether or not it is comparable to another schema, whether or not complexity changes as expected when the XML schema code is changed.

In another aspect, the actual definitions of the complexity metrics are provided for calculation complexity of a given schema.

In yet another aspect thereof, the complexity number is categorized into a complexity level relative to the node count of the schema.

In still another aspect, the metrics can be reported to the designer as a feedback mechanism in a schema development tool.

A strength of the novel metrics is its alignment with naïve schema size is only superficial. That is, the metric measure is likely to increase with naïve schema size only insofar that a larger schema is likely to comprise more decisions.

Accordingly, the invention disclosed and claimed herein, in one aspect thereof, comprises a schema component for processing schema code, and a metrics component for outputting a psychological complexity value based on complexity of the schema code. In one implementation, the schema code is based on an XML schema, and the metrics component defines a new variation of a McCabe cyclomatic complexity metric to XML schemas to determine the complexity value. The decisions employed for computing schema complexity can include choices, occurrence constraints, element references to substitution groups, type references to types that are extended or restricted, a multiplicity of root element declarations, and nillable elements.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

DETAILED DESCRIPTION

Figure 1:
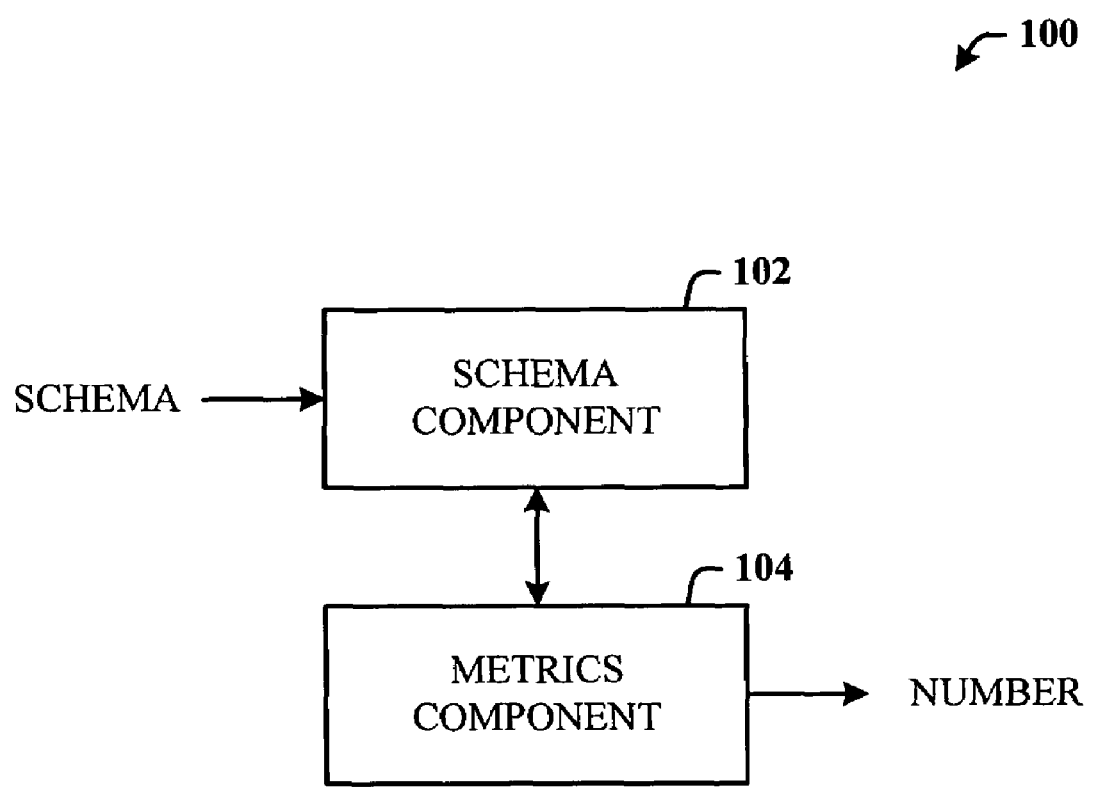
FIG. 1 illustrates a system that facilitates schema code analysis for a complexity metric value in accordance with an innovative aspect.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof.

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

The subject innovation provides an unprecedented feature in tool support for schema design. That is, the generation of complexity metrics allows for providing feedback to schema developers such that they have a notion of code complexity of their schema code. In particular, schema designers can thereby be encouraged to decrease complexity on the basis of refactorings and other transformations, and they can measure the effect of their schema changes. Disclosed herein is code-level complexity metrics that can be algorithmically calculated for any given schema. The metrics provides a single ordinal number that summarizes the psychological code complexity of a schema in terms of the decisions that are encoded in the schema (e.g., XML-extensible markup language schema, and DTD-document type definition). XML schema defines the content used in an XML document. The XML schema is a superset of DTD, which is a standard SGML (standard generalized markup language) schema. Without such a metrics, schema developers are not able to quantify the complexity of their schemas; and therefore, they cannot assess whether or not the complexity of a schema is acceptable, whether or not it is comparable to another schema, and whether or not complexity changes as expected when the XML schema code is changed.

In one implementation of the subject innovation, a variation on the McCabe cyclomatic complexity (MCC) is developed and defined for schemas. A typical use of MCC metrics is to approximate the psychological complexity of code, as relevant for program understanding. There exist slight variations of the MCC definition in the literature, but an abstract characterization typically states that MCC measures the number of linearly independent paths through the control-flow graph of a program module. Since a schema (e.g., XML schema and DTD) is not a program, the normal definition of MCC is not applied directly. However, the disclosed MCC variation adopts what is believed to be the essence of MCC for at least XML schemas. The language-independent essence of this MCC variation is to count coded "decisions". For instance, one may calculate MCC for procedural programs by counting all condition nodes.

The disclosed instantiation of MCC is entirely non-trivial because of the distance between normal programming languages for which MCC has been instantiated historically, versus XML schemas. What is adopted from the "intention" of MCC is the idea to measure decisions.

This work is most closely related to conventional McCabe metrics for grammars of the kind that are used for programming language syntaxes. That is, context-free grammars provide expressiveness that is similar to some aspects of XML schemas, namely alternatives (productions) in context-free grammars are similar to the choice construct in XML schemas. All issues related to subtyping in the MCC instance for XML schemas have no analogy whatsoever in the grammar version. The same holds for the need to count multiple root-element declarations. Yet, the same holds for nillable elements. The issue of occurrence constraints for XML schemas (which are counted in a certain way by the invented metrics) is similar in vein to the EBNF (Extended Backus-Naur Form) operators ("?", "*", "+"). The use of MCC as a means to categorize XML schema complexity and to provide input complexity-decreasing schema transformations is unprecedented.

Referring initially to the drawings, FIG. 1 illustrates a system 100 that facilitates schema code analysis for a complexity metric value in accordance with an innovative aspect. The system 100 can include a schema component 102 that receives schema code or facilitates generation of schema code during a code design process. A metric component 104 executes a metrics algorithm on the schema code and outputs a number that indicates a complexity measure of the schema code. Accordingly, the user/designer can receive immediate feedback as to the complexity of code written.

Figure 2:
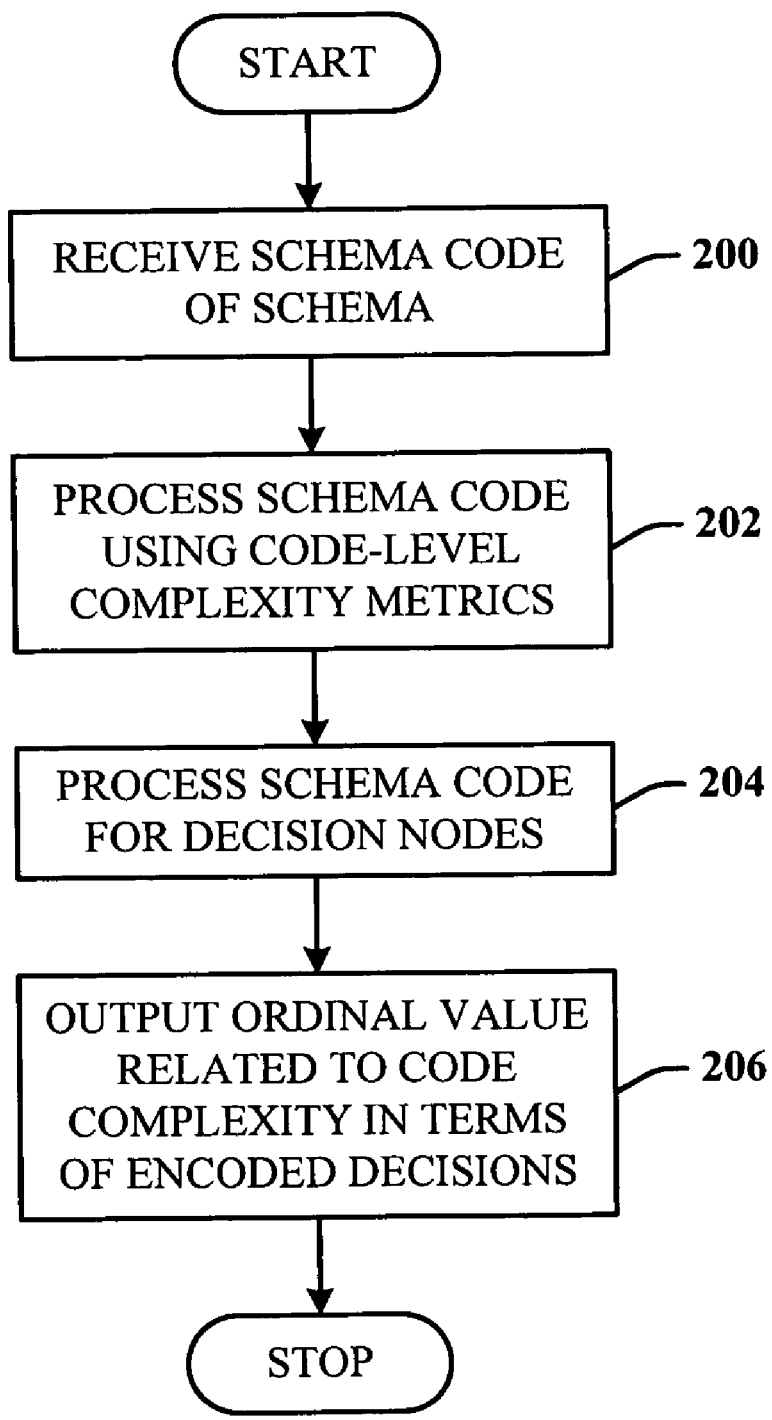
FIG. 2 illustrates a methodology of generating a complexity metric for the schema code.

FIG. 2 illustrates a methodology of generating a complexity metric for the schema code. While, for purposes of simplicity of explanation, the one or more methodologies shown herein, e.g., in the form of a flow chart or flow diagram, are shown and described as a series of acts, it is to be understood and appreciated that the subject innovation is not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation.

At 200, schema code (e.g., XML schema and DTD) is received for complexity processing. At 202, the schema code is processed using a code-level complexity metric. At 204, the schema code is processed for decision nodes. At 206, a final ordinal value is output which indicates complexity of the schema code as currently written.

Figure 3:
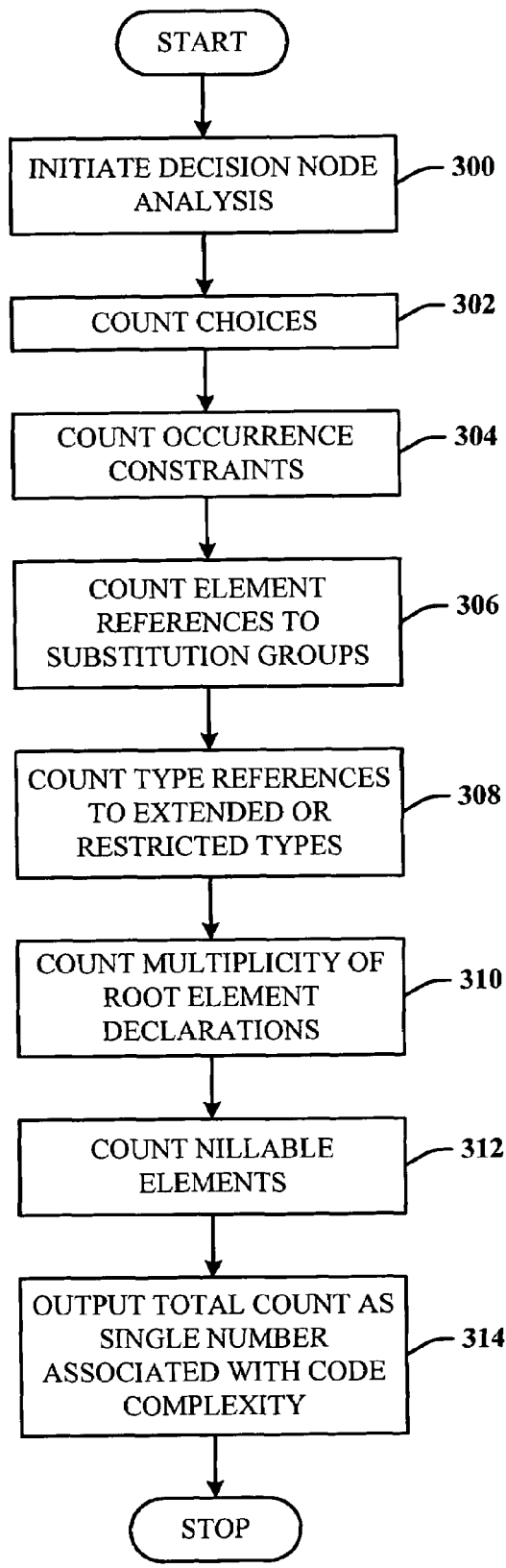
FIG. 3 illustrates a methodology of analyzing decision nodes as part of complexity processing in accordance with another aspect.

Referring now to FIG. 3, there is illustrated a methodology of analyzing decision nodes as part of complexity processing in accordance with another aspect. In one implementation, the decision nodes can include choices, occurrence restraints, element references to substitution groups, type references to types that are extended or restricted, a multiplicity of root element declarations, and nillable elements. The reasoning behind such a metrics for schemas is the following. The program execution of a validator or a document processor may involve all these decisions. In fact, schema understanding may also need to deal with all these decisions. This is the informal argument in favor of the MCC metrics for XML schema. In the case of normal programs, one tends to consider MCC per procedure or per module. In the case of schemas, all decisions for the entire schema are immediately summed up. Hence, a single ordinal number is obtained for the structural complexity of a schema.

At 300, decision node analysis, as part of complexity determination, is initiated. At 302, the number of choices is counted. At 304, the number of occurrence restraints is counted. At 306, element references to substitution groups are counted. At 308, type references to extended or restricted types are counted. At 310, root element declarations are counted. At 312, nillable elements are counted. At 314, the total count is output as a single number which provides an indication as to the complexity (e.g., psychological) of the code.

Figure 4:
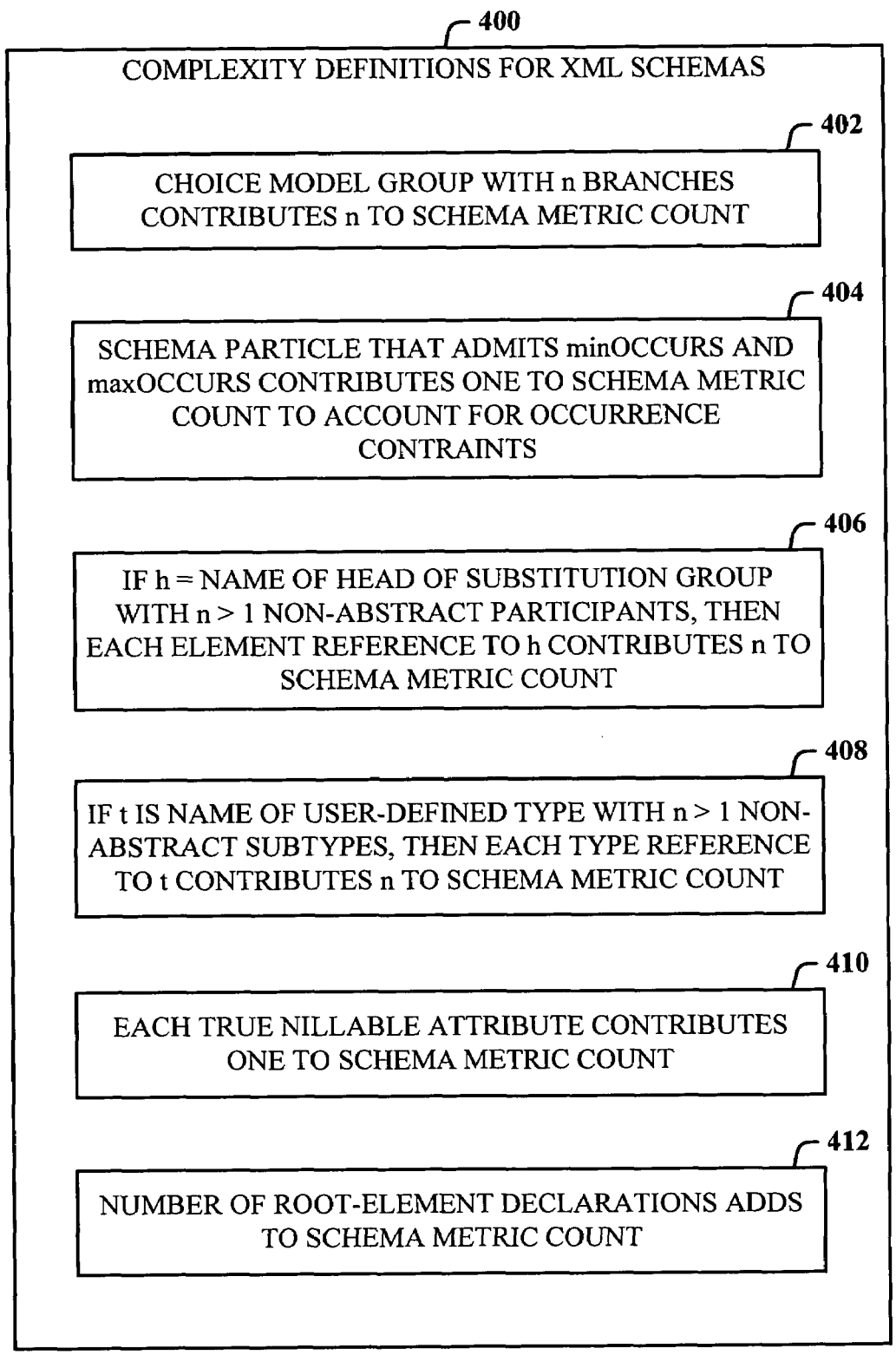
FIG. 4 illustrates a block of complexity definitions which are executed as part of the complexity metric processing in accordance with another aspect of the innovation.

FIG. 4 illustrates a block of complexity definitions 400 which are executed as part of the complexity metric processing in accordance with another aspect of the innovation. At 402, a choice model group with n branches contributes n to a schema's MCC. At 404, a schema particle that admits the minOccurs and maxOccurs attributes may contribute a value of one to a schema's MCC, in order to account for the occurrence constraints. To define this precisely, look at the attribute values modulo the defaults for the case that the attributes were not specified in the code. Recall that these defaults are minOccurs=maxOccurs="1". Now, a given particle contributes a value of one for its occurrence constraint(s) to MCC, if minOccurs≠maxOccurs.

At 406, if h is the name of the head of a substitution group with n>1 non-abstract participants, potentially counting h itself (if it is non-abstract), then each element reference to h contributes n to a schema's MCC. At 408, if t is the name of user-defined (as opposed to primitive) type with n>1 non-abstract subtypes (including derived typed and t itself, if it is non-abstract), then each type reference to t contributes n to a schema's MCC. At 410, each true nillable attribute contributes a value of one to a schema's MCC. Finally, at 412, a number of root-element declarations is added to a schema's MCC value.

Before continuing with an example using the above definitions, an alternative implementation on the above definitions also includes counting references to singleton hierarchies. Accordingly, the definitions for steps 406 and 408 can be changed to n>0, rather than n>1.

Following is an annotated schema sample:

```
<?xml version="1.0" encoding="utf-8" ?>
<!-- McCabe complexity is 11. -->
<xs:schema xmlns:xs="http://www.w3.org/2001/XMLSchema">
  <!-- Two root-element declarations -->
  <!-- The first one references a base type. -->
  <xs:element name="foo" type="type1"/>
  <xs:element name="bar" substitutionGroup="foo" type="type2"/>
  <xs:complexType name="type1"/>
  <xs:complexType name="type2">
    <xs:complexContent>
      <xs:extension base="type1">
        <!-- A choice with three branches -->
        <xs:choice>
          <!-- The following element is nillable. -->
          <xs:element name="branch1" type="xs:int" nillable="true"/>
          <!-- The following element carries an occurrence constraint. -->
          <xs:element name="branch2" type="xs:int"
```

```
            maxOccurs="unbounded"/>
          <!-- There is a reference to a substitution group. -->
          <xs:element ref="foo"/>
        </xs:choice>
      </xs:extension>
    </xs:complexContent>
  </xs:complexType>
</xs:schema>
```

The various encoded decisions add up to eleven in the above code.

The above-stated definition is unambiguous and implementable. As a further point of reference, an executable specification of MCC for XML schemas is provided, using Prolog, for example, to this end. The following predicate takes X—an XML representation of an XML schema, and returns the MCC measure, C, for that schema.

```
%
% Compute MCC by deep traversal over schema
% Add the number of global element declarations.
%
mccMeasure(X,C)
    :-
       deepCount(mccHelper,X,C1),
       numberOfGlobals(element,X,C2),
       C is C1 + C2.
```

Here, note that the predicate deepCount (mccHelper) issues deep traversal of the given XML representation x of the schema in question. (The routine specification of the higher-order predicate deepCount is omitted.) At each and every node, deepCount attempts the application of mccHelper. The intermediate result of any successful application of mccHelper is added to the final result. The predicate numberOfGlobals (element,X,C2) counts all global element declarations. Its trivial definition is omitted.

Now define all the cases of mccHelper in the sequel.

```
%
% When facing a choice
%    count all element-type children of the choice group;
%    also record whether or not non-trivial occur constraints are present.
%
mccHelper(X,C)
    :-
       testElement(choice,Attrs,Children,X),
       filter(testElement,Children,Children1),
       length(Children1,C1),
       mccOccurs(Attrs,C1,C).
```

Note that testElement is a predicate for XML processing, which tests whether a given XML tree ($4^{th}$ and last parameter of testElement) is rooted by an element with the given tag ($1^{st}$ parameter of testElement); as a side effect the tree is taken apart to provide access to its attributes and its children ($2^{nd}$ and $3^{rd}$ parameter of testElement). Also note that filter is a higher-order predicate that extracts all those list elements from its $2^{nd}$ parameter for which the argument predicate ($1^{st}$ parameter of filter) succeeds. In the example, filter away all non-element children of x.

The compensation for minOccurs/maxOccurs is done as follows:

```
%
% Add 1 if minOccurs <> maxOccurs
%
mccOccurs(Attrs,C1,C)
    :-
    minOccurs(Attrs,Min), % retrieve minOccurs attribute with 1
as default
    maxOccurs(Attrs,Max), % retrieve maxOccurs attribute with 1
as default
    ( Min == Max -> C = C1 ; C is C1 + 1 ).
```

Continuing with the cases for mccHelper.

```
%
% When faced with an element reference
%   count all (non-abstract) subtypes of the referenced element
%   (potentially include the referenced element itself);
%   also record whether or not non-trivial occur constraints are
present.
%
mccHelper(X,C)
    :-
    testElement(element,Attrs,_Children,X),
    member(RA,Attrs),
    testAttribute(ref,QName,RA),
    mccSubtypeCount(element,QName,C1),
    mccOccurs(Attrs,C2,C).
```

The specification of mccSubtypeCount returns the number of relevant number of subtypes. Its $1^{st}$ parameter identifies the symbol namespace for subtyping (element in this case). The $2^{nd}$ parameter is the qualified name of the type whose subtypes are to be counted. The $3^{rd}$ parameter holds the result. Thus:

```
%
% Count the non-abstract subtypes of a given type.
%   Both element and type types are admitted.
%   If there is just one such type, return 0 (i.e., no
decision).
%
mccSubtypeCount(Kind,QName,C)
    :-
    nonAbstractSubtypesOf(Kind,QName,Subs),
    length(Subs,C1),
    ( C1 == 1 -> C = 0 ; C = C1 ),
    !.
```

The routine specification of nonAbstractSubtypesOf is left out, which is defined by the rules of the XML schema language. It is assumed that the predicate is reflexive for the case that the given base type is non-abstract.

Continuing with the cases for mccHelper.

```
%
% When faced with an element declaration with a named type
%   count all (non-abstract) subtypes of the referenced types
%   (potentially include the referenced type itself);
%   also record whether or not non-trivial occur constraints are
present;
%   also record whether or not the element is said to be
nillable.
%
mccHelper(X,C)
    :-
    testElement(element,Attrs,Children,X),
    member(NA,Attrs),
    testAttribute(name,NA),
    elementType(Attrs,Children,QName),
    mccSubtypeCount(type,QName,C1),
    mccNillable(Attrs,C1,C2),
    mccOccurs(Attrs,C2,C).
```

The compensation for nillables is performed as follows:

```
%
% Add 1 for nillable elements
%
mccNillable(Attrs,C1,C)
    :-
    ( member(NA,Attrs),
      testAttribute(nillable,'true',NA)
    )
    -> C is C1 + 1; C = C1.
```

Continuing with the cases for mccHelper.

```
%
% Catch-call case for element declarations.
%   (Triggers for element declarations without explicit type.)
%   Record whether or not non-trivial occur constraints are
present;
%   Record whether or not the element is said to be nillable.
%
mccHelper(X,C)
    :-
    testElement(element,Attrs,_Children,X),
    mccNillable(Attrs,0,C1),
    mccOccurs(Attrs,C1,C).
%
% Catch-all case for content particles that have occurrence
constraints
%
mccHelper(X,C)
    :-
    testElement(_,Attrs,_Children,X),
    mccOccurs(Attrs,0,C).
```

This completes the executable specification, which completely implements the earlier definitions of MCC for XML schemas.

As further information, the novel metrics can be made insensitive to the use of flat content models in contrast to the use of extra elements for grouping parts of a content model. This characteristic can be illustrated with the following two type definitions whose MCC measure is the same regardless of the extra sub-element bORc that appears in the second definition:

```
<xs:element name="a">
    <xs:complexType>
        <xs:choice>
            <xs:element name="b"/>
            <xs:element name="c"/>
        </xs:choice>
    </xs:complexType>
</xs:element>
<xs:element name="a">
    <xs:complexType>
        <xs:sequence>
            <xs:element name="bORc">
                <xs:complexType>
```

```
        <xs:choice>
            <xs:element name="b"/>
            <xs:element name="c"/>
        </xs:choice>
      </xs:complexType>
    </xs:element>
  </xs:sequence>
</xs:complexType>
</xs:element>
```

Some details of the above decision definitions are worth further description. It is to be understood that certain ones of the decision definitions can be favored (or weighted differently) than others. For example, the choice decision can be favored merely because it describes the setup found to be most convenient and for the schema harness available. Following are some indications for other variation points in the earlier definitions.

It can be argued that a choice should contribute just one point overall to a schema's MCC, regardless of the number of branches. However, by counting the number of branches, the branches are honored as "decisions". An MCC metric for imperative programs counts the cases of an imperative switch statement (e.g., as in C++) normally just like that. This argument can be adopted for substitution groups and type references. That is, MCC for XML schemas captures that "subtype polymorphism" introduces complexity, which increases with the number of "subtypes".

It can also be argued that each attribute with use=optional should contribute one to a schema's MCC. However, the optional status of an attribute is the common case (in fact, optional, is the default for use), which appears to be a less important decision.

One may also argue that any attribute and any element of a simple type requires a sort of "decision" insofar that the simple type must be inhabited as such (unless a default is present). These leaf-level decisions are not counted as they may lead to an explosion in the total number of decisions; but one may want to count them in certain applications of the MCC metrics for XML schemas.

One may also argue that certain or all uses of wildcards (e.g., any, anyAttribute, xs:anyType) suggest counting these wildcards in the calculation of MCC. However, use of these features is, however, better observed in a more prominent manner than a slightly increased MCC. One may count the use of these features on the basis of simple heuristics. For instance, an occurrence of any can be counted as the number of root-element declarations in scope. (This requires extra-linguistic means of defining that scope.) If this occurrence is qualified by a namespace, one can count the occurrence as the number of all root-element declarations in the relevant namespace.

Figure 5:
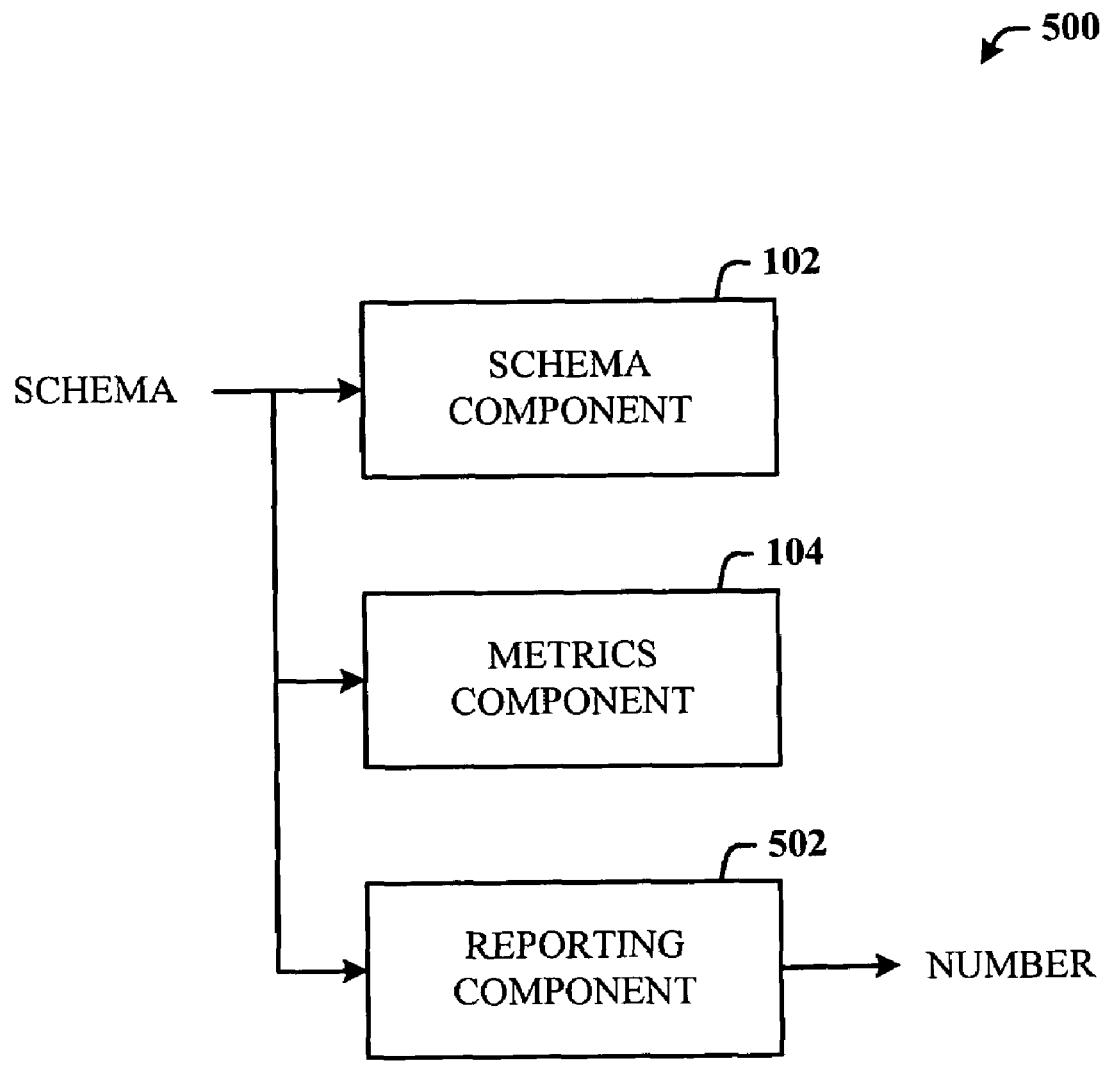
FIG. 5 illustrates a system that employs a reporting component for reporting complexity number.

FIG. 5 illustrates a system 500 that employs a reporting component 502 for reporting complexity number. In addition to the schema component 102 and metrics component 104, the reporting component 502 facilitates output of the complexity number to the user. This can be via a user interface of the design tool, for example.

As indicated above, the complexity value can be output as a raw number. Alternatively, the raw number can be associated with a category which is then output to the designer. For example, the following four categories can be employed for schema MCC-based complexity: trivial, simple, difficult, and intractable. Additionally, to somewhat decouple from the naïve schema size, the ratio (#NODE-#ANN)/MCC is categorized. Accordingly, the intractable level can include values of zero to four, the difficult level can include values of 5-10, the simple level can include values of 11-20 and the trivial category level can include values over 20.

These specific values should not be regarded as a fixed, but only provide one mechanism for reporting. Any refinement of can be based on such complexity levels, similar in vein to trivial, simple, difficult, and intractable. The number of levels can be greater or less than that indicated, at the discretion of the designer. The precise numerical limits depend somewhat on the application domain of schemas and any possible refinement that may be applied to our reference definition of MCC for schemas. One may also categorize MCC on the basis of the MCC ordinals, but this will be more sensitive to schema size.

Figure 6:
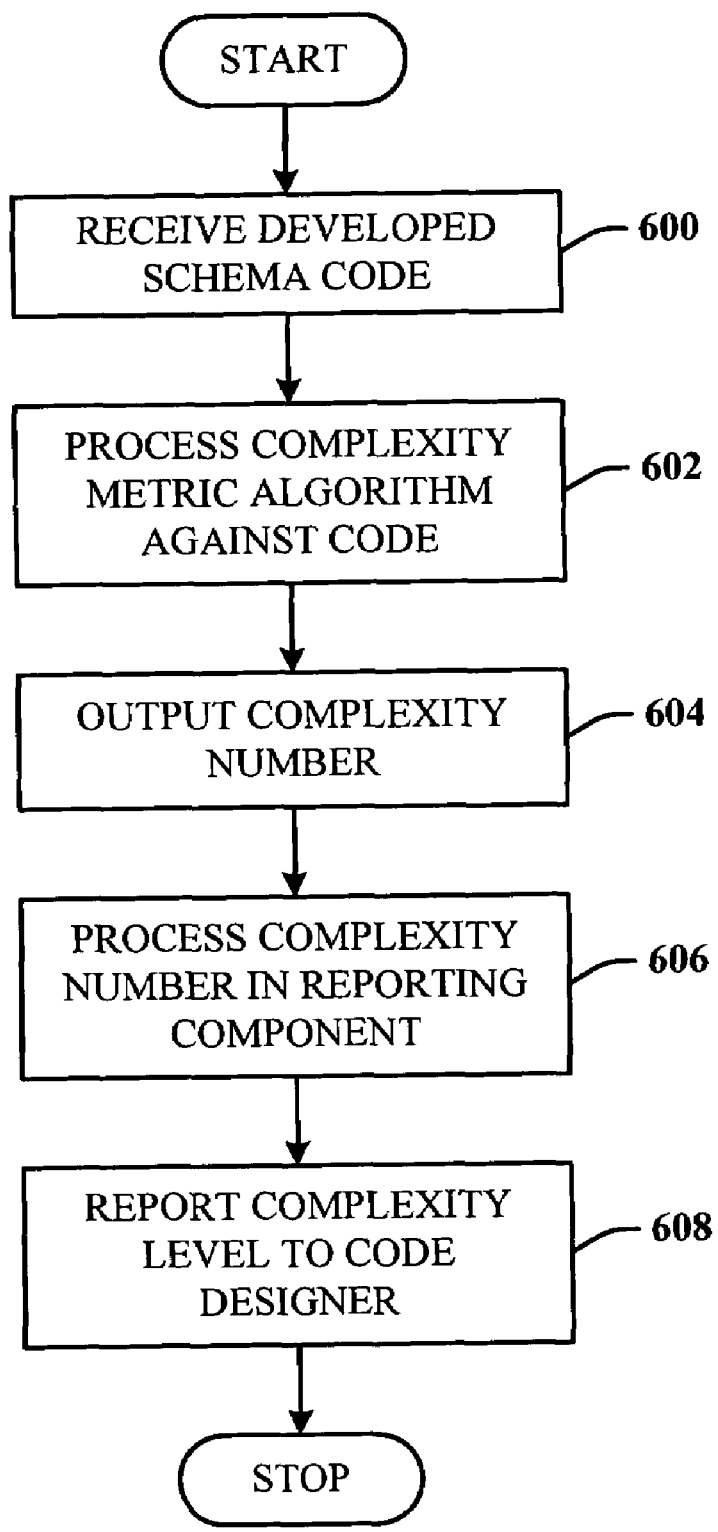
FIG. 6 illustrates a flow diagram of a methodology reporting the complexity value as part of schema code processing.

Accordingly, FIG. 6 illustrates a flow diagram of a methodology reporting the complexity value as part of schema code processing. At 600, schema code is received for processing. At 602, the complexity algorithm is executed on the schema code. At 604, the complexity number is generated. At 606, the number is then prepared for output via the reporting component. At 608, the complexity value is reported out via the reporting component as a complexity level.

Figure 7:
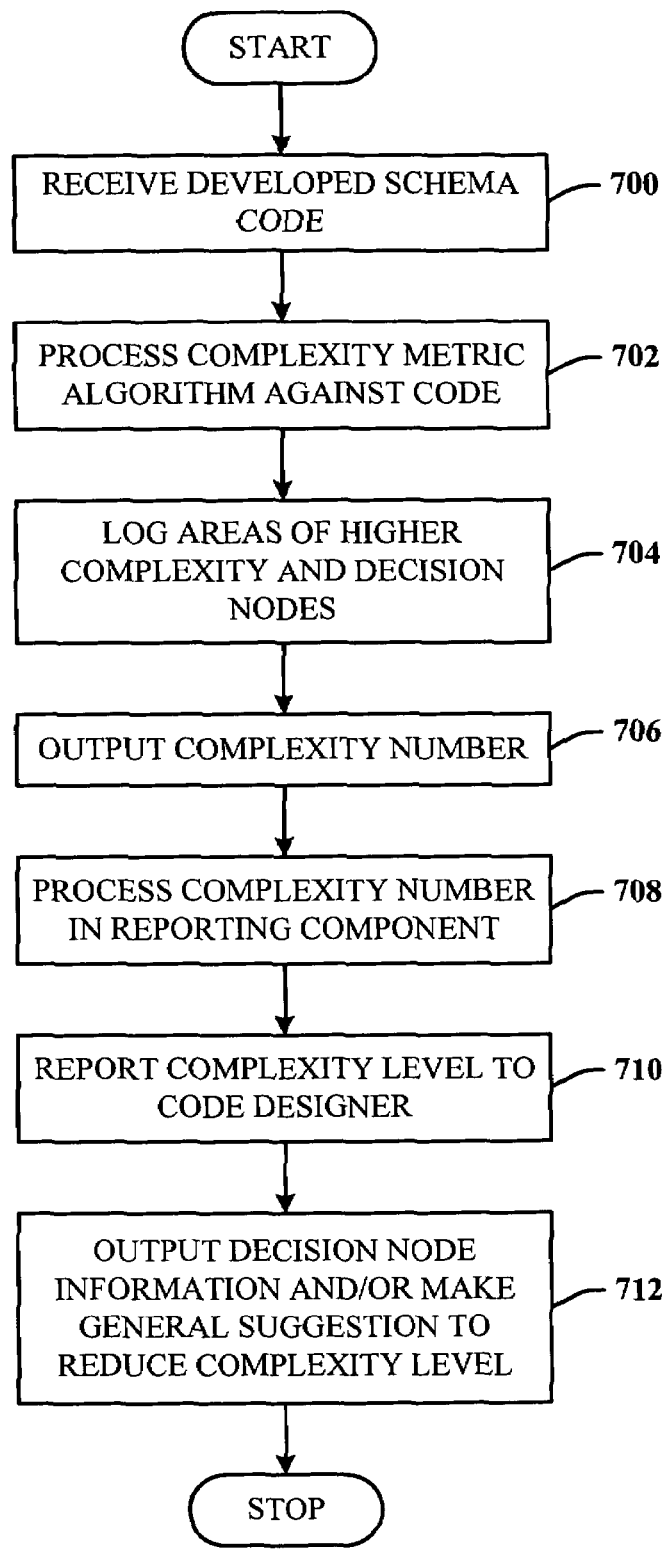
FIG. 7 illustrates an alternative methodology of logging and outputting more detailed complexity information and suggestion message according to an aspect.

FIG. 7 illustrates an alternative methodology of logging and outputting more detailed complexity information and suggestion message according to an aspect. At 700, schema code is received for processing. At 702, the complexity algorithm is executed on the schema code. At 704, areas of higher complexity and the associated decision node information are logged. At 706, the complexity number is output. At 708, the number is then processed for reporting out. At 710, the associated complexity level is output. At 712, logged decision node information is output, and/or one or more suggestions for reducing the complexity associated with the current state of the schema code.

Figure 8:
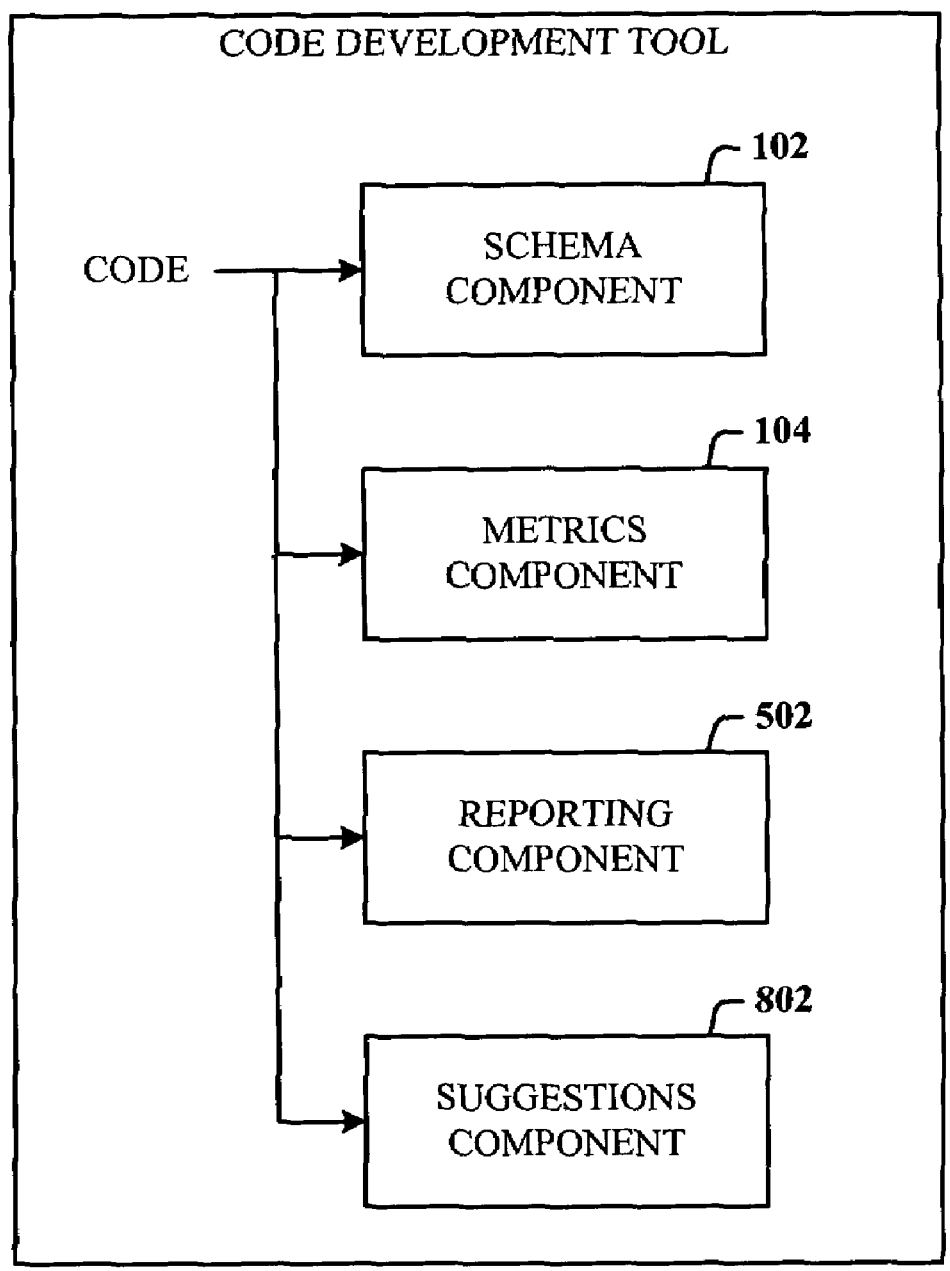
FIG. 8 illustrates a development tool that facilitates schema complexity processing and suggestions in accordance with an aspect.

FIG. 8 illustrates a development tool 800 that facilitates schema complexity processing and suggestions in accordance with an aspect. The system can include the schema component 102 and the metrics component 104 of FIG. 1, the reporting component 502 of FIG. 5, and a suggestions component 802 for issuing one or more suggestions for reducing the current complexity level, as computed during, for example, a first-pass complexity code analysis. The suggests component 802 can provide suggestions for reducing the complexity level one step (e.g., from intractable to difficult) to the next lower level and/or to the least complex level (e.g., from intractable to trivial).

It is to be understood that since the subject innovation facilitates reducing complexity, it can, for certain purposes, be utilized in reverse to increase complexity. Although this could impact performance, the impact may be so minimal as to allow increasing complexity to, for example, make it more difficult for a competitor to copy. Other reasons for doing so are left to the discretion of the designer.

Figure 9:
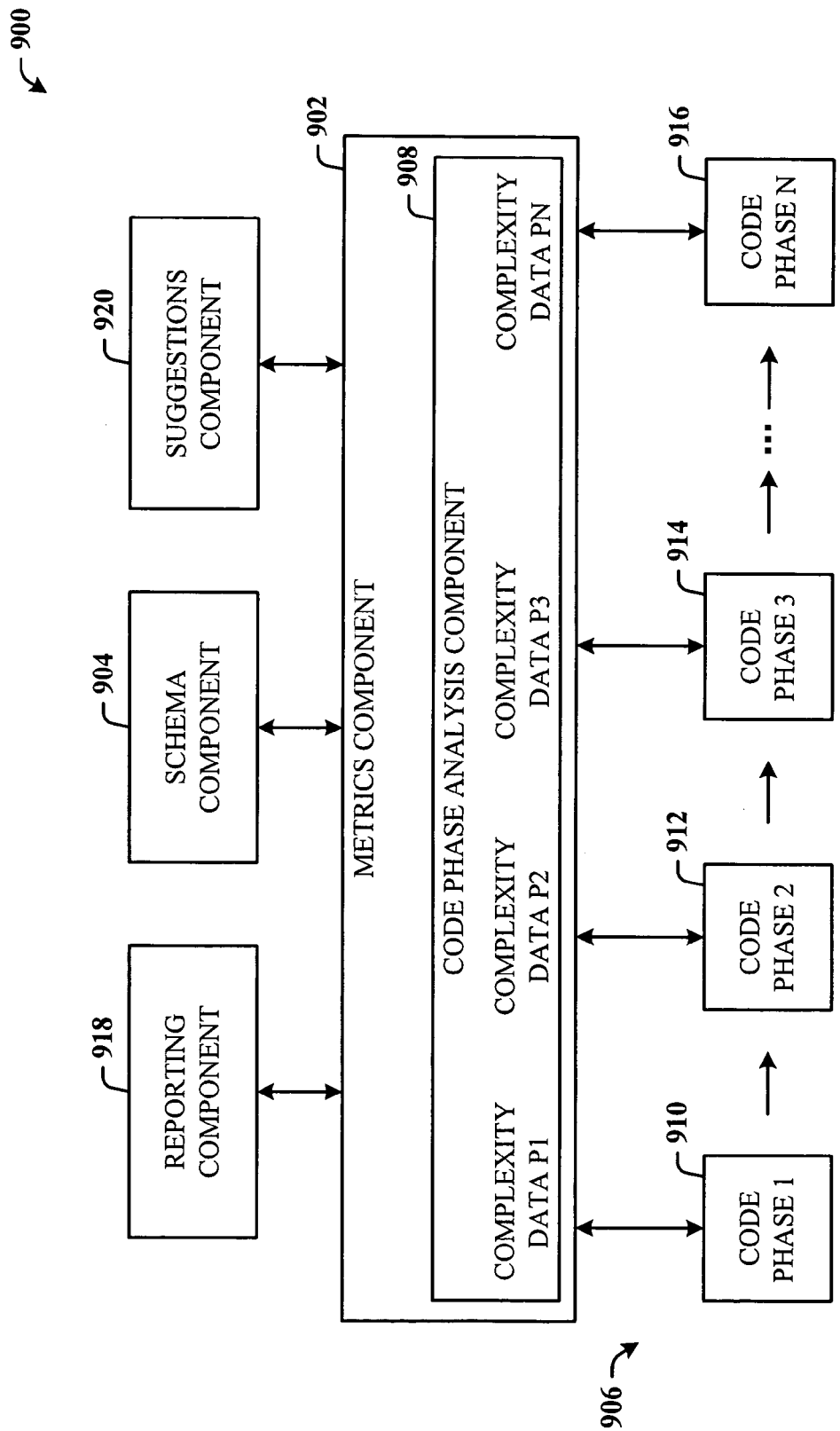
FIG. 9 illustrates a complexity analysis and processing system that employs interim complexity analysis in accordance with an innovative aspect.

FIG. 9 illustrates a complexity analysis and processing system 900 that employs interim complexity analysis in accordance with an innovative aspect. The system 900 can employ a metrics component 902 that receives schema code from a schema component 904, and perform complexity processing on many different phases 906 of code creation. For example, a code phase analysis component 908 of the complexity component 902 can perform interim processing of a first code phase 910 (denoted CODE PHASE 1), a second code phase 912 (denoted CODE PHASE 2), a third code phase 914 (denoted CODE PHASE 3) up to an nth code phase 916 (denoted CODE PHASE N). The code phase analysis component 908 facilitates processing the code at each phase 906 to extract an interim complexity value (denoted COMPLEXITY DATA P1, COMPLEXITY DATA P2, COMPLEXITY DATA P3, . . . , COMPLEXITY DATA PN, where N is an integer) and associated complexity level, either or both of which can be output via a reporting component 918. Along with the complexity value and/or level information, or in lieu thereof altogether, the system 900 can output suggestions via a suggestions component 920 that indicate to the designer how to change the current complexity for that phase 906 of code or what coding techniques to avoid in the existing phase or overall, in general.

Figure 10:
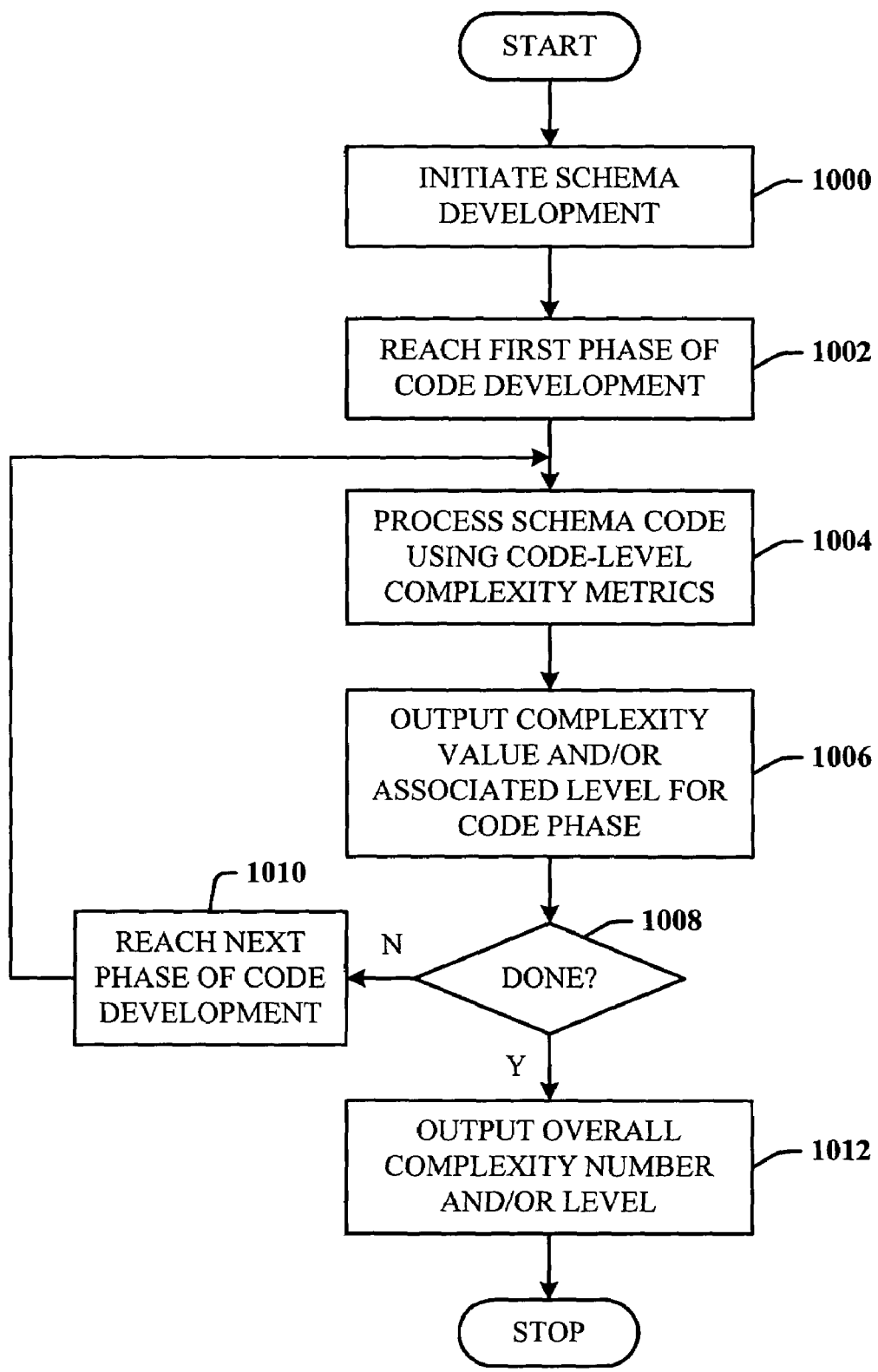
FIG. 10 illustrates a flow diagram of a methodology of interim code complexity analysis according to an aspect.

FIG. 10 illustrates a flow diagram of a methodology of interim code complexity analysis according to an aspect. At 1000, schema code development is initiated. At 1002, a first phase of code development is reached. At 1004, the schema code is processed using code-level complexity metrics. At 1006, complexity data is computed and output, which data can include either or both of a complexity number or/and complexity level of the existing phase code. At 1008, the system checks for the code processing being completed. If not, flow is from 1008 to 1010 where the designer reaches the next phase of code development. Progress then loops back to 1004 to process the schema code for complexity data and output the complexity data for this next phase of code development.

If, at 1008, the system has completed code processing, flow is to 1012 where an overall complexity number and/or level can then be output to the designer. That is, even though the interim values may have indicated that the schema code is of a lower complexity, it is to be understood that the overall code analysis can result in a higher complexity value or indication. Accordingly, the overall complexity value may provide some valuable information. This value may not simply be an accumulation of the interim values, but can be a separate independent examination of the overall code at the final design phase.

Figure 11:
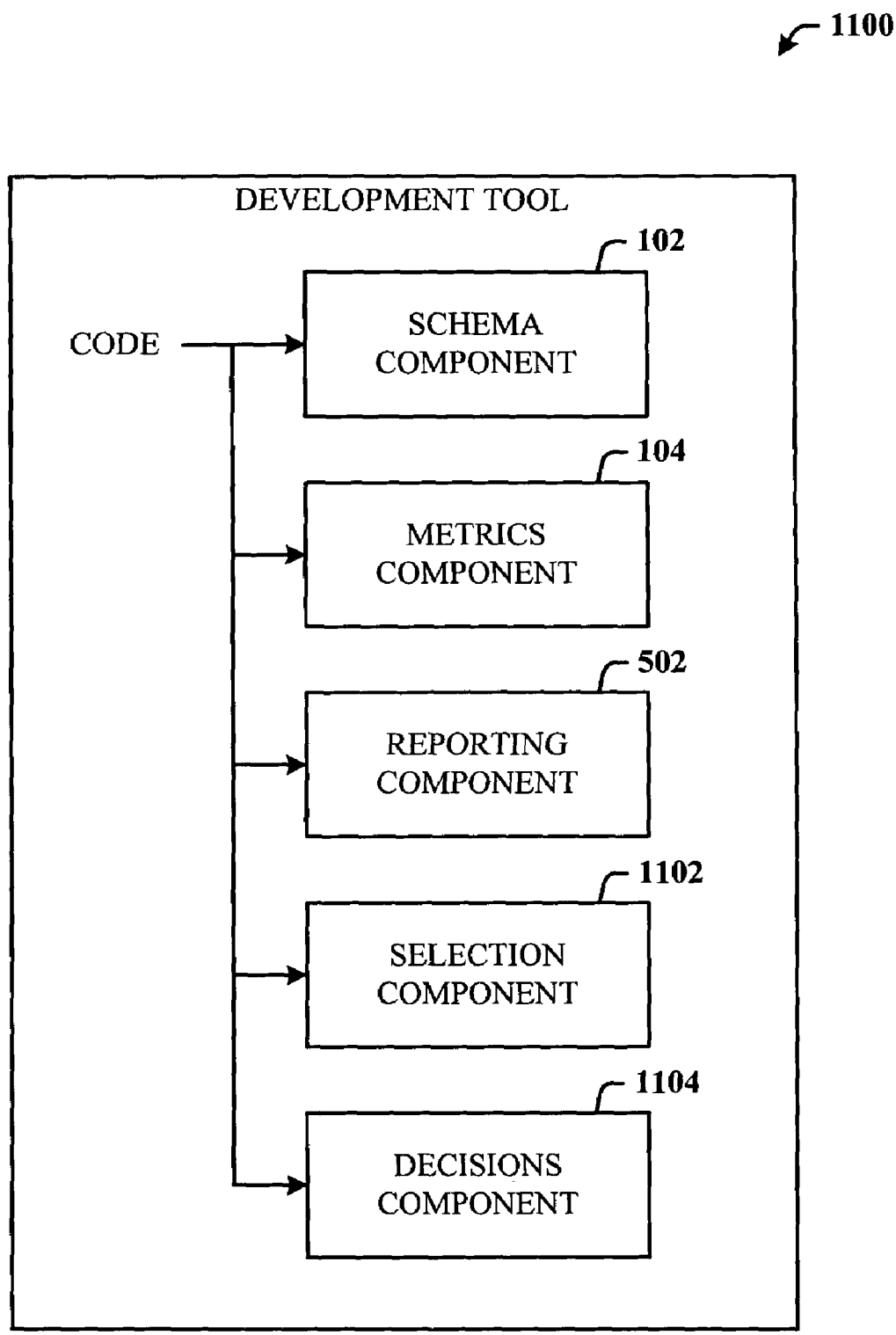
FIG. 11 illustrates a development tool system that can employ section and decision selection processing in accordance with another alternative aspect.

FIG. 11 illustrates a development tool system 1100 that can employ section and decision selection processing in accordance with another alternative aspect. The code designer can input code during the development process to the schema component 102, which can then be passed to the metrics component 104 for complexity metrics processing. The reporting component 502 facilitates reporting complexity data to the designer in the many ways described herein. A selection component 1102 allows the designer/user to opt-in or opt-out of receiving different information throughout the code development process. For example, the designer can opt-out of receiving a category level result, yet opt-in to receiving the complexity number, opt-out to receiving complexity data during interim code analysis, opt-out to any interim code analysis, etc. In another selection example, the designer can select which decision nodes to examine (or not to examine) during complexity analysis. Accordingly, a decisions component 1104 is provided that interfaces to the selection component 1102 to allow this selection process to occur. For example, the designer can be presented with a list of decision nodes to select or deselect for complexity process during the overall or final code analysis, or for interim code analysis.

Figure 12:
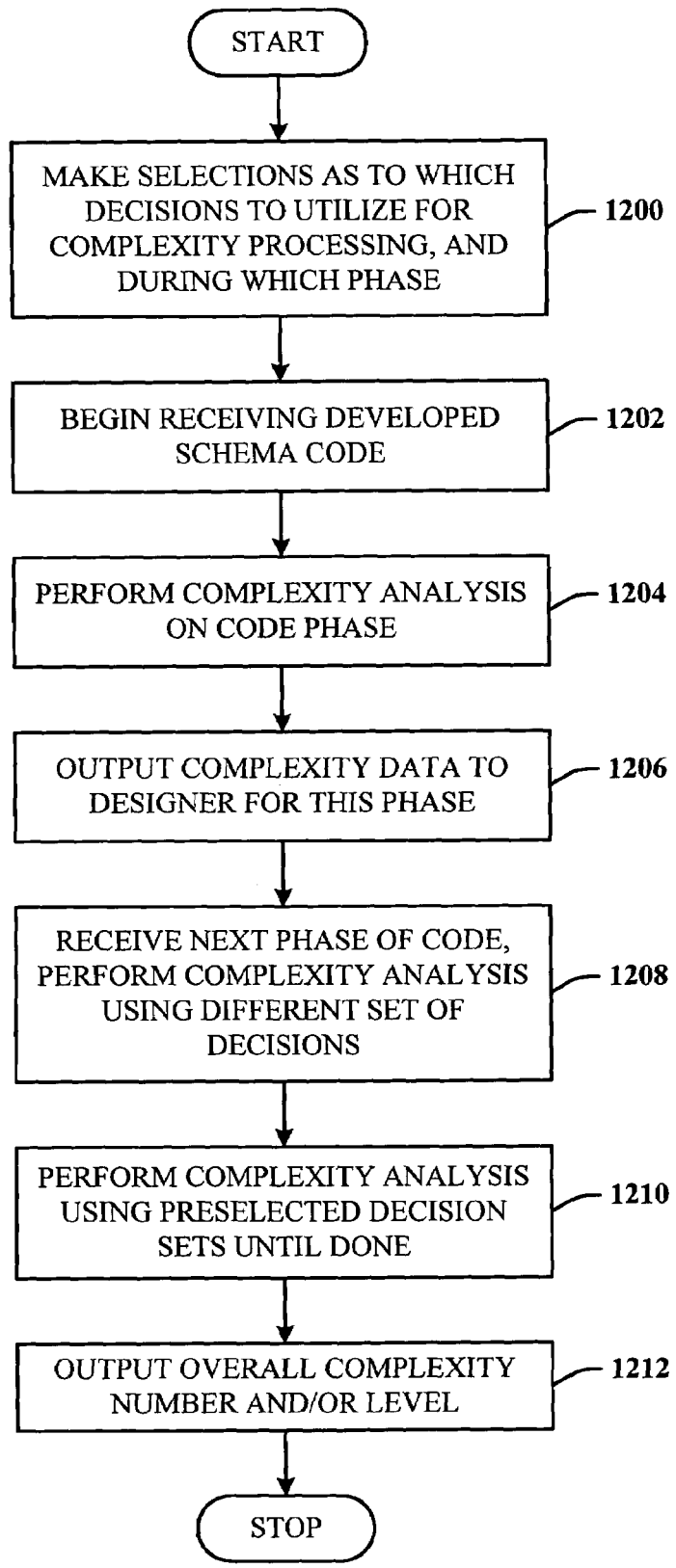
FIG. 12 illustrates a methodology of selective decision processing in accordance with an aspect.

FIG. 12 illustrates a methodology of selective decision processing in accordance with an aspect. At 1200, the designer selects which decisions should be examined for complexity processing, and during which phase of code complexity analysis. At 1202, the system begins receiving schema code. At 1204, complexity analysis is performed on a code phase. At 1206, complexity data (e.g., complexity number and/or complexity level) is output to the designer for this phase of code. At 1208, the next phase of code developed by the designer is received for complexity analysis using a different set of decisions. At 1210, complexity analysis continues on the remaining phases of code using the preselected decision sets for each phase, until completed. At 1212, an overall complexity number and/or level is output to the designer.

Figure 13:
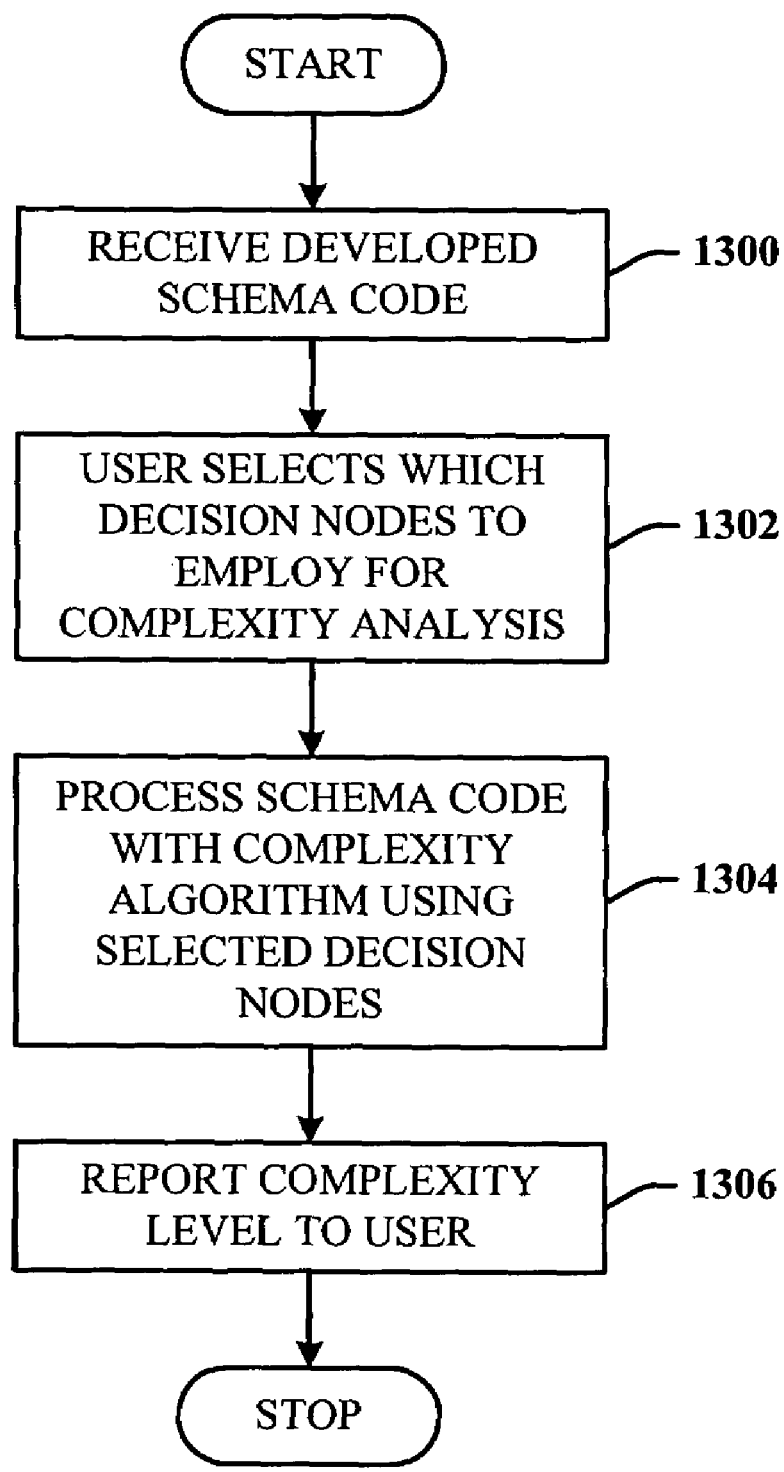
FIG. 13 illustrates a flow diagram that represents a methodology of selecting a set of decision nodes that will be examined for the all of the schema code.

FIG. 13 illustrates a flow diagram that represents a methodology of selecting a set of decision nodes that will be examined for the all of the schema code. At 1300, the developed schema code is received. At 1302, the user selects which decision nodes will be used for complexity processing. At 1304, the schema code is processing with the complexity algorithm using the preselected decision information. At 1306, the complexity level is report out to the user.

Figure 14:
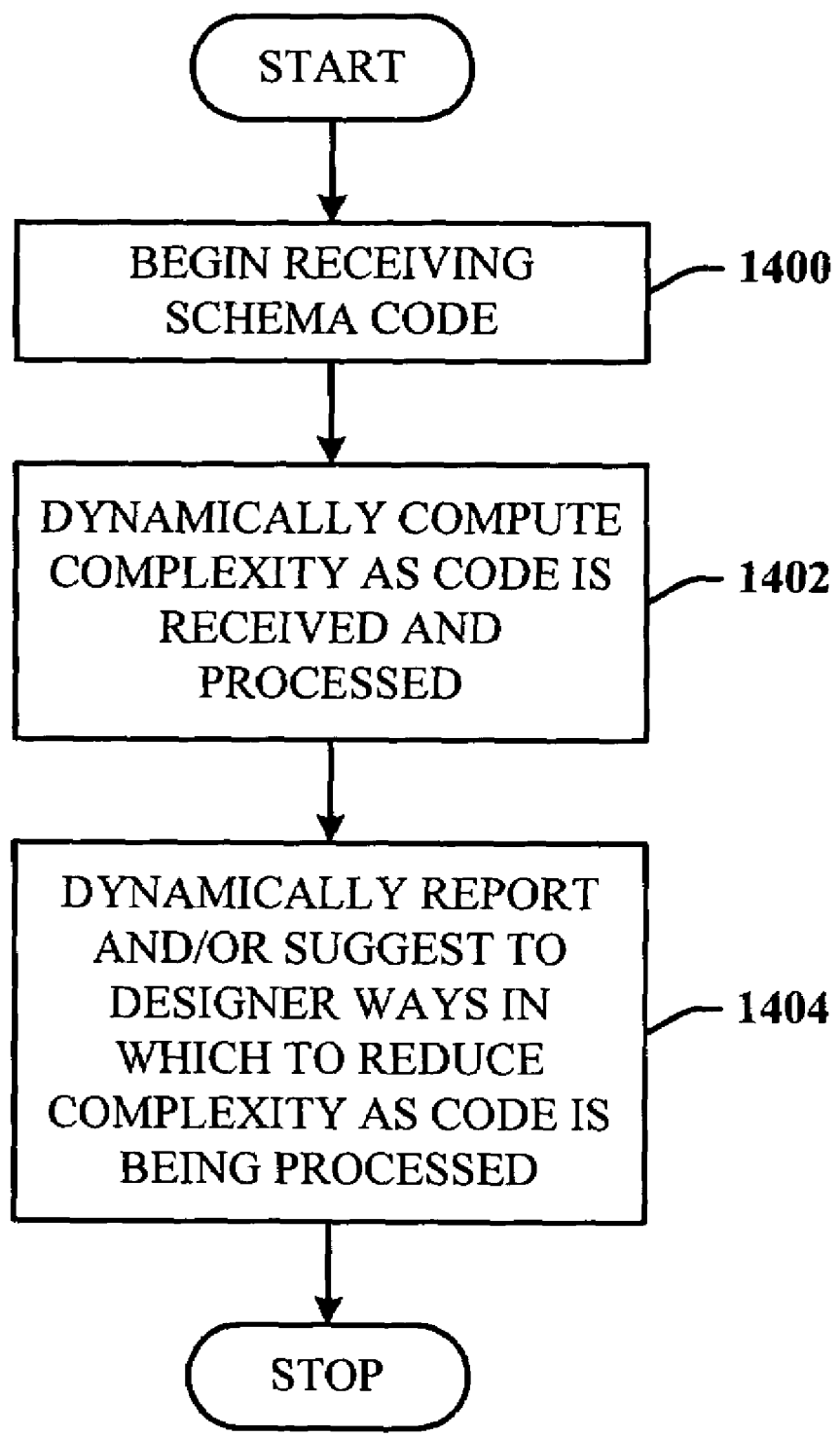
FIG. 14 illustrates a methodology of dynamically reporting information to the designer during code development.

FIG. 14 illustrates a methodology of dynamically reporting information to the designer during code development. At 1400, schema code being developed is received for processing. At 1402, the complexity information is computer dynamically as the code is received and processed. At 1404, the complexity data is dynamically reported and/or suggestions made to the designer for ways of reducing the complexity at this section of code, as the code is being written and processed.

Figure 15:
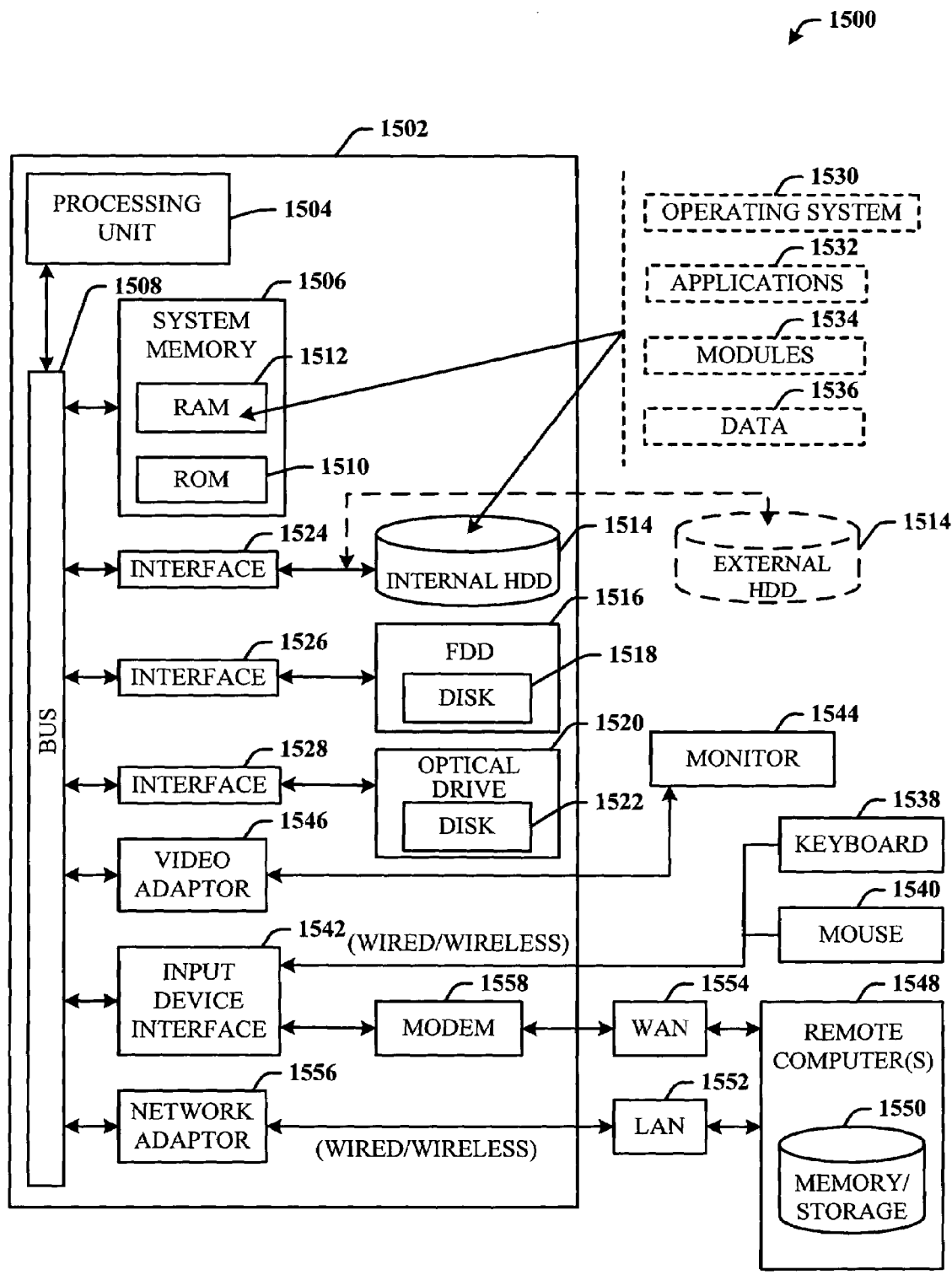
FIG. 15 illustrates a block diagram of a computer operable to execute the disclosed complexity analysis and processing architecture.

Referring now to FIG. 15, there is illustrated a block diagram of a computer operable to execute the disclosed complexity analysis and processing architecture. In order to provide additional context for various aspects thereof, FIG. 15 and the following discussion are intended to provide a brief, general description of a suitable computing environment 1500 in which the various aspects of the innovation can be implemented. While the description above is in the general context of computer-executable instructions that may run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and non-volatile media, removable and non-removable media. By way of example, and not limitation, computer-readable media can comprise computer storage media and communication media. Computer storage media includes both volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

With reference again to FIG. 15, the exemplary environment 1500 for implementing various aspects includes a computer 1502, the computer 1502 including a processing unit 1504, a system memory 1506 and a system bus 1508. The system bus 1508 couples system components including, but not limited to, the system memory 1506 to the processing unit 1504. The processing unit 1504 can be any of various commercially available processors. Dual microprocessors and other multi-processor architectures may also be employed as the processing unit 1504.

The system bus 1508 can be any of several types of bus structure that may further interconnect to a memory bus (with or without a memory controller), a peripheral bus, and a local bus using any of a variety of commercially available bus architectures. The system memory 1506 includes read-only memory (ROM) 1510 and random access memory (RAM) 1512. A basic input/output system (BIOS) is stored in a non-volatile memory 1510 such as ROM, EPROM, EEPROM, which BIOS contains the basic routines that help to transfer information between elements within the computer 1502, such as during start-up. The RAM 1512 can also include a high-speed RAM such as static RAM for caching data.

The computer 1502 further includes an internal hard disk drive (HDD) 1514 (e.g., EIDE, SATA), which internal hard disk drive 1514 may also be configured for external use in a suitable chassis (not shown), a magnetic floppy disk drive (FDD) 1516, (e.g., to read from or write to a removable diskette 1518) and an optical disk drive 1520, (e.g., reading a CD-ROM disk 1522 or, to read from or write to other high capacity optical media such as the DVD). The hard disk drive 1514, magnetic disk drive 1516 and optical disk drive 1520 can be connected to the system bus 1508 by a hard disk drive interface 1524, a magnetic disk drive interface 1526 and an optical drive interface 1528, respectively. The interface 1524 for external drive implementations includes at least one or both of Universal Serial Bus (USB) and IEEE 1394 interface technologies. Other external drive connection technologies are within contemplation of the subject innovation.

The drives and their associated computer-readable media provide nonvolatile storage of data, data structures, computer-executable instructions, and so forth. For the computer 1502, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the disclosed innovation.

A number of program modules can be stored in the drives and RAM 1512, including an operating system 1530, one or more application programs 1532, other program modules 1534 and program data 1536. All or portions of the operating system, applications, modules, and/or data can also be cached in the RAM 1512. It is to be appreciated that the innovation can be implemented with various commercially available operating systems or combinations of operating systems.

A user can enter commands and information into the computer 1502 through one or more wired/wireless input devices, e.g., a keyboard 1538 and a pointing device, such as a mouse 1540. Other input devices (not shown) may include a microphone, an IR remote control, a joystick, a game pad, a stylus pen, touch screen, or the like. These and other input devices are often connected to the processing unit 1504 through an input device interface 1542 that is coupled to the system bus 1508, but can be connected by other interfaces, such as a parallel port, an IEEE 1394 serial port, a game port, a USB port, an IR interface, etc.

A monitor 1544 or other type of display device is also connected to the system bus 1508 via an interface, such as a video adapter 1546. In addition to the monitor 1544, a computer typically includes other peripheral output devices (not shown), such as speakers, printers, etc.

The computer 1502 may operate in a networked environment using logical connections via wired and/or wireless communications to one or more remote computers, such as a remote computer(s) 1548. The remote computer(s) 1548 can be a workstation, a server computer, a router, a personal computer, portable computer, microprocessor-based entertainment appliance, a peer device or other common network node, and typically includes many or all of the elements described relative to the computer 1502, although, for purposes of brevity, only a memory/storage device 1550 is illustrated. The logical connections depicted include wired/wireless connectivity to a local area network (LAN) 1552 and/or larger networks, e.g., a wide area network (WAN) 1554. Such LAN and WAN networking environments are commonplace in offices and companies, and facilitate enterprise-wide computer networks, such as intranets, all of which may connect to a global communications network, e.g., the Internet.

When used in a LAN networking environment, the computer 1502 is connected to the local network 1552 through a wired and/or wireless communication network interface or adapter 1556. The adaptor 1556 may facilitate wired or wireless communication to the LAN 1552, which may also include a wireless access point disposed thereon for communicating with the wireless adaptor 1556.

When used in a WAN networking environment, the computer 1502 can include a modem 1558, or is connected to a communications server on the WAN 1554, or has other means for establishing communications over the WAN 1554, such as by way of the Internet. The modem 1558, which can be internal or external and a wired or wireless device, is connected to the system bus 1508 via the serial port interface 1542. In a networked environment, program modules depicted relative to the computer 1502, or portions thereof, can be stored in the remote memory/storage device 1550. It will be appreciated that the network connections shown are exemplary and other means of establishing a communications link between the computers can be used.

The computer 1502 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11x (a, b, g, etc.) to provide secure, reliable, fast wireless connectivity. A Wi-Fi network can be used to connect computers to each other, to the Internet, and to wired networks (which use IEEE 802.3 or Ethernet).

Wi-Fi networks can operate in the unlicensed 2.4 and 5 GHz radio bands. IEEE 802.11 applies to generally to wireless LANs and provides 1 or 2 Mbps transmission in the 2.4 GHz band using either frequency hopping spread spectrum (FHSS) or direct sequence spread spectrum (DSSS). IEEE 802.11a is an extension to IEEE 802.11 that applies to wireless LANs and provides up to 54 Mbps in the 5 GHz band. IEEE 802.11a uses an orthogonal frequency division multiplexing (OFDM) encoding scheme rather than FHSS or DSSS. IEEE 802.11b (also referred to as 802.11 High Rate DSSS or Wi-Fi) is an extension to 802.11 that applies to wireless LANs and provides 11 Mbps transmission (with a fallback to 5.5, 2 and 1 Mbps) in the 2.4 GHz band. IEEE 802.11g applies to wireless LANs and provides 20+Mbps in the 2.4 GHz band. Products can contain more than one band (e.g., dual band), so the networks can provide real-world performance similar to the basic 10BaseT wired Ethernet networks used in many offices.

Figure 16:
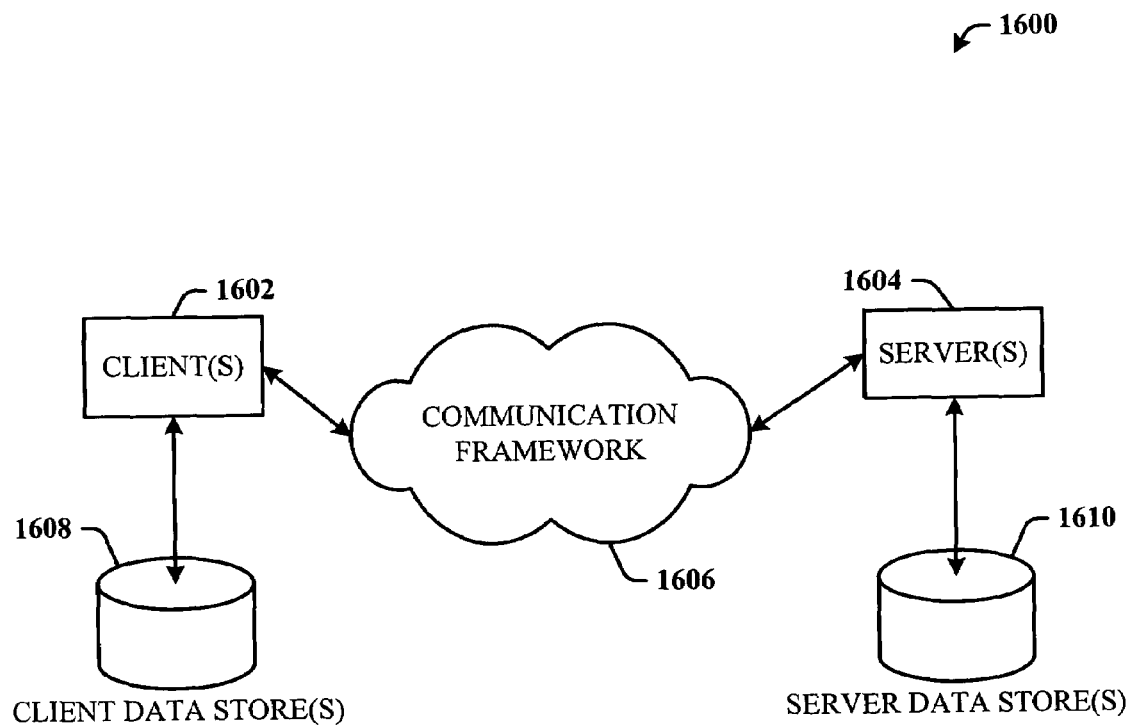
FIG. 16 illustrates a schematic block diagram of an exemplary computing environment.

Referring now to FIG. 16, there is illustrated a schematic block diagram of an exemplary computing environment 1600 in accordance with another aspect. The system 1600 includes one or more client(s) 1602. The client(s) 1602 can be hardware and/or software (e.g., threads, processes, computing devices). The client(s) 1602 can house cookie(s) and/or associated contextual information by employing the subject innovation, for example.

The system 1600 also includes one or more server(s) 1604. The server(s) 1604 can also be hardware and/or software (e.g., threads, processes, computing devices). The servers 1604 can house threads to perform transformations by employing the invention, for example. One possible communication between a client 1602 and a server 1604 can be in the form of a data packet adapted to be transmitted between two or more computer processes. The data packet may include a cookie and/or associated contextual information, for example. The system 1600 includes a communication framework 1606 (e.g., a global communication network such as the Internet) that can be employed to facilitate communications between the client(s) 1602 and the server(s) 1604.

Communications can be facilitated via a wired (including optical fiber) and/or wireless technology. The client(s) 1602 are operatively connected to one or more client data store(s) 1608 that can be employed to store information local to the client(s) 1602 (e.g., cookie(s) and/or associated contextual information). Similarly, the server(s) 1604 are operatively connected to one or more server data store(s) 1610 that can be employed to store information local to the servers 1604.

What has been described above includes examples of the disclosed innovation. It is, of course, not possible to describe every conceivable combination of components and/or methodologies, but one of ordinary skill in the art may recognize that many further combinations and permutations are possible. Accordingly, the innovation is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented method of computing code complexity of an XML schema code, comprising:

receiving XML schema code;
analyzing the XML schema code to determine a complexity value of the XML schema code, wherein the complexity value is determined by performing the following acts:
(a) for each choice group model in the XML schema code, adding n to the complexity value where n is the number of branches in the choice group model;
(b) adding a value of one to the complexity value for each element in the XML schema code having a nillable attribute equal to true;
(c) adding a value of one to the complexity value for each root element declaration in the XML schema code;
(d) adding a value of v to the complexity value for each type reference to a user-defined type t, where v is the number of non-abstract subtypes of t;
(e) adding a value of j to the complexity value for each element that references a substitution group, where j is the number of non-abstract participants in the substitution group; and
(f) adding a value of one to the complexity value for each element in the XML schema code having an occurrence constraint except for an element that includes occurrence constraints where minOccurs is equal to maxOccurs; and
reporting the complexity datavalue.

2. The method of claim 1, wherein the complexity value is determined during an interim phase of development of the XML schema code.

3. The method of claim 1, further comprising an act of dynamically presenting a suggestion that reduces the complexity value of the XML schema code.

4. The method of claim 1, further comprising an act of biasing the calculation of the complexity value by adjusting the value generated by the performance of at least one of acts (a)-(f) by a factor.

5. A computer-implemented system for indicating code complexity, comprising:
a processor and memory storing the following computer executable components:
a schema component for processing XML schema code; and
a metrics component for outputting a complexity value based on complexity of the XML schema code, wherein the metrics component, when executed by the processor, calculates the complexity value by performing the following acts:
(a) for each choice group model in the XML schema code, adding n to the complexity value where n is the number of branches in the choice group model;
(b) adding a value of one to the complexity value for each element in the XML schema code having a nillable attribute equal to true;
(c) adding a value of one to the complexity value for each root element declaration in the XML schema code;
(d) adding a value of v to the complexity value for each type reference to a user-defined type t, where v is the number of non-abstract subtypes of t;
(e) adding a value of j to the complexity value for each element that references a substitution group, where j is the number of non-abstract participants in the substitution group; and
(f) adding a value of one to the complexity value for each element in the XML schema code having an occurrence constraint except for an element that includes occurrence constraints where minOccurs is equal to maxOccurs.

6. The system of claim 5, wherein the metrics component further biases the calculation of the complexity value by adjusting the value generated by the performance of at least one of acts (a)-(f) by a factor.

7. The system of claim 5, wherein the complexity value is associated with a complexity level that defines a range of complexity values.

8. The system of claim 5, wherein the metrics component generates the complexity value during an interim schema code design process.

9. The system of claim 5, wherein the metrics component generates the complexity value during at an end of a schema code design process.

10. The system of claim 5, further comprising a reporting component that outputs a suggestion for reducing complexity of the schema code.

11. A computer storage medium storing computer executable instructions which when executed by a processor of a computer perform a method of computing code complexity of an XML schema code, comprising:
    receiving XML schema code;
    analyzing the XML schema code to determine a complexity value of the XML schema code, wherein the complexity value is determined by performing the following acts:
    (a) for each choice group model in the XML schema code, adding n to the complexity value where n is the number of branches in the choice group model;
    (b) adding a value of one to the complexity value for each element in the XML schema code having a nillable attribute equal to true;
    (c) adding a value of one to the complexity value for each root element declaration in the XML schema code;
    (d) adding a value of v to the complexity value for each type reference to a user-defined type t, where v is the number of non-abstract subtypes of t;
    (e) adding a value of j to the complexity value for each element that references a substitution group, where j is the number of non-abstract participants in the substitution group; and
    (f) adding a value of one to the complexity value for each element in the XML schema code having an occurrence constraint except for an element that includes occurrence constraints where minOccurs is equal to maxOccurs; and
    reporting the complexity value.

12. The computer storage medium of claim 11, wherein the complexity value is determined during an interim phase of development of the XML schema code.

13. The computer storage medium of claim 11, further comprising an act of dynamically presenting a suggestion that reduces the complexity value of the XML schema code.

14. The computer storage medium of claim 11, further comprising an act of biasing the calculation of the complexity value by adjusting the value generated by the performance of at least one of acts (a)-(f) by a factor.

* * * * *